United States Patent
Hill et al.

(10) Patent No.: US 7,472,645 B2
(45) Date of Patent: Jan. 6, 2009

(54) LIFT/LATCH MECHANISM TO RAISE UPPER PLATEN OF GRILL

(75) Inventors: David A. Hill, Rockton, IL (US); Robert E. Frisque, Milton, WI (US); Dennis J Nelson, Rockford, IL (US)

(73) Assignee: Carrier Commercial Refrigeration Inc., Charlotte, NC (US)

( * ) Notice: Subject to any disclaimer, the term of this patent is extended or adjusted under 35 U.S.C. 154(b) by 616 days.

(21) Appl. No.: 11/004,371

(22) Filed: Dec. 3, 2004

(65) Prior Publication Data

US 2005/0120890 A1    Jun. 9, 2005

Related U.S. Application Data

(60) Provisional application No. 60/528,160, filed on Dec. 9, 2003.

(51) Int. Cl.
*A47J 37/06* (2006.01)
(52) U.S. Cl. .............................. 99/372; 99/349; 99/423
(58) Field of Classification Search .................. 99/422, 99/423, 424, 389, 349, 372, 379
See application file for complete search history.

(56) References Cited

U.S. PATENT DOCUMENTS

| | | | | | |
|---|---|---|---|---|---|
| 2,244,145 | A | * | 6/1941 | Erickson | 99/337 |
| 2,788,427 | A | * | 4/1957 | Fresone et al. | 219/483 |
| 4,913,040 | A | * | 4/1990 | Sherman et al. | 99/372 |
| 4,972,766 | A | * | 11/1990 | Anetsberger | 99/332 |
| 5,531,155 | A | * | 7/1996 | Pellicane et al. | 99/349 |
| 5,890,419 | A | * | 4/1999 | Moravec | 99/349 |

* cited by examiner

*Primary Examiner*—Reginald L Alexander
(74) *Attorney, Agent, or Firm*—Carlson, Gaskey & Olds

(57) ABSTRACT

A grill includes a lower portion and a pivotably attached upper platen each having a grilling surface. A lift/latch mechanism lifts the upper platen relative to the lower portion without the use of a motor. The upper platen can be manually lifted by grabbing the handle. An arm is pivotably attached to an upper pivotable portion at an upper pivot and is pivotably attached to a lower pivotable portion at a lower pivot. When the upper platen is lifted, a heavy resilient member biases the upper platen to a raised position. When the upper platen is lowered, a light resilient member bias the upper platen to a lowered position. When a solenoid is actuated, projection engages the arm to move the arm and lift the upper platen.

14 Claims, 4 Drawing Sheets

LIFT/LATCH MECHANISM TO RAISE UPPER PLATEN OF GRILL

This patent application claims priority to U.S. Provisional Application No. 60/528,160 filed on Dec. 9, 2003.

BACKGROUND OF THE INVENTION

The present invention relates generally to a lift/latch mechanism used to lift and latch an upper platen of a grill without the use of a motor.

Grills or griddles are used to cook various foods, such as hamburgers. In one prior grill, the sides of the food are grilled separately. The food is placed on a grilling surface, grilling the side of the food that contacts the grilling surface. After that side of the food is cooked, the food is manually flipped to cook the opposite side. After the food is cooked, the food is manually removed from the grill for serving.

In another prior grill, both sides of the food are grilled simultaneously. After programming the type of food into a control unit, the food is placed on a lower grilling surface. An upper platen having an upper grilling surface is then lowered onto the food, positioning the food in a gap between the upper and lower grilling surfaces to simultaneously grill both sides of the food. After a predetermined amount of time has passed, the upper platen raises, and the food can be manually removed from the grill.

In prior grills, a motor is used to raise the upper platen. Generally, the upper platen raises after grilling the food for a predetermined amount of time. The upper platen can also be raised by pressing a release button to operate the motor and raise the upper platen. In the event that an operator gets a hand or finger trapped between the grilling surfaces, the release button must be accessible to allow the upper platen to lift. A drawback to employing a motor is that the upper platen will not raise if there is a power failure.

Hence, there is a need in the art for a lift/latch mechanism that lifts and latches an upper platen of a grill without the use of a motor and that overcomes the drawbacks and the shortcomings of the prior art.

SUMMARY OF THE INVENTION

A grill includes a grilling component having a lower portion and an upper platen pivotably attached to the lower portion. The lower portion and the upper platen each include a grilling surface. Food is grilled in a gap defined between the grilling surfaces. The upper platen includes a handle that allows an operator to lift and pivot the upper platen relative to the lower portion.

The grill includes a lift/latch mechanism that lifts the upper platen relative to the lower portion without the use of a motor. The upper platen can be manually lifted by grabbing the handle or can be lifted by pressing a button to actuate a solenoid to lift the upper platen.

An upper pivotable portion is attached to the upper platen. A first end of an arm is pivotably attached to the upper pivotable portion at an upper pivot, and an opposing second end of the arm is pivotable attached to a lower pivotable portion at a lower pivot. A heavy resilient member is attached to the upper pivotable portion and a stationary location of the grill, and a light resilient member is attached to the lower pivotable portion and another stationary location of the grill.

When the food items are added to or removed from the grill, the upper platen is lifted. During lifting, the upper pivotable portion moves clockwise, pivoting the arm about the upper point and moving the lower pivotable portion counter-clockwise. If the upper platen is released before the light resilient member passes the over-center position, the light resilient member lowers the upper platen. As the upper platen continues to lift and the light resilient member passes the over-center position, and the heavy resilient member overcomes the force provided by the light resilient member. The heavy resilient member then biases the upper platen to raise the upper platen.

The upper platen is lowered by reversing this movement. The heavy resilient member provides a force that biases the upper platen to the raised position. During lowering, after the heavy resilient member passes the over-center position, the light resilient member overcomes the force provided by the heavy resilient member to lower the upper platen.

A solenoid can be actuated in an emergency by an operator to raise the upper platen. A projection from the solenoid engages the arm to push the arm and rotate the upper pivotable portion clockwise to raise the upper platen. Alternately, the upper platen can be manually raised by the operator in the event of an emergency, thus over-powering the latch.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
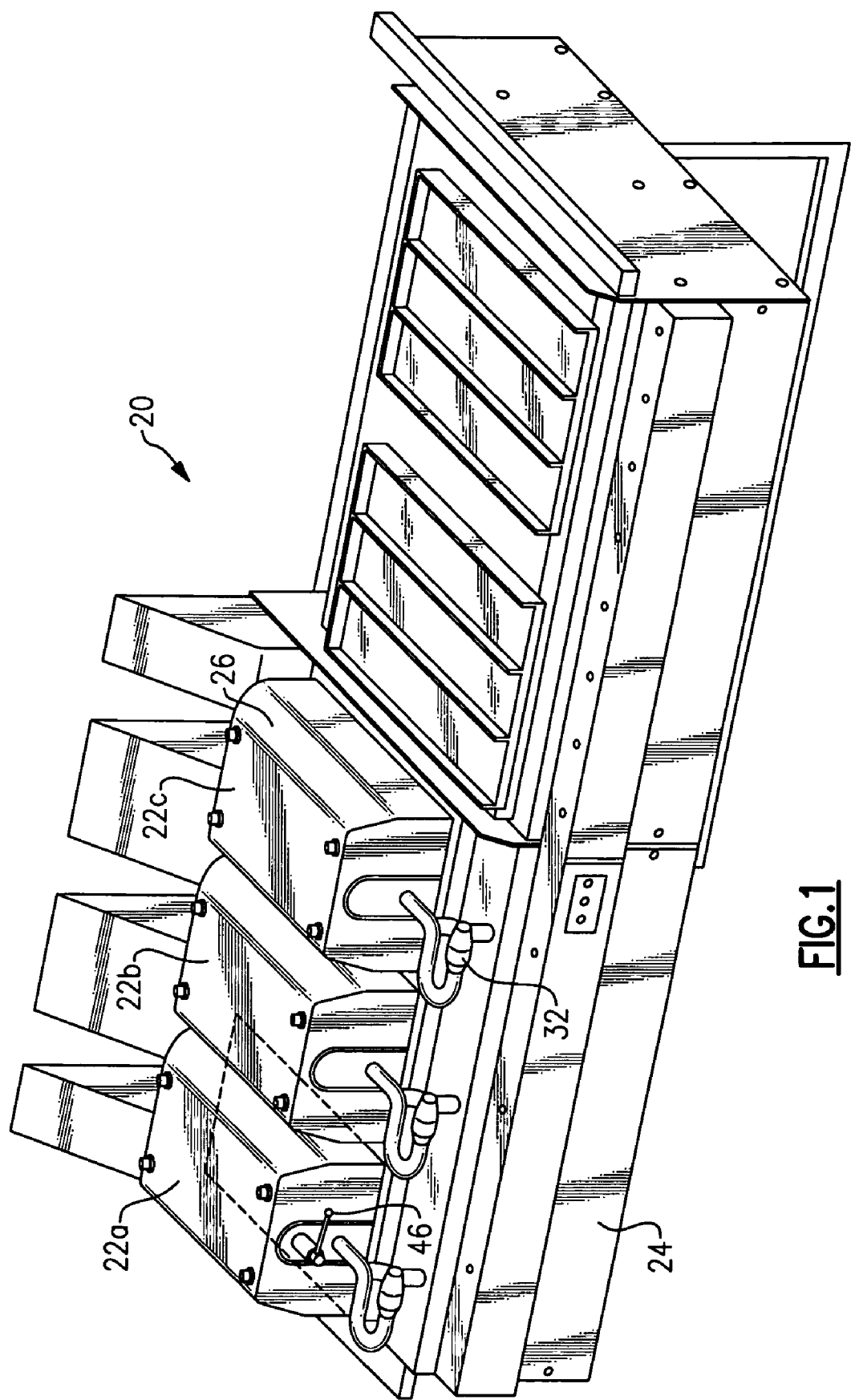
FIG. 1 illustrates a perspective view of a grill of the present invention with the upper platens lowered.

FIG. 1 illustrates a grill 20 of the present invention. The grill 20 includes three grilling components 22a, 22b and 22c each including a lower portion 24 and an upper platen 26 pivotally attached to the lower portion 24. Although three grilling components 22a, 22b and 22c are illustrated and described, any number of grilling components 22 can be employed. A handle 32 on the upper platen 26 can be grabbed by an operator to pivot the upper platen 26 relative to the lower portion 24 between a lowered position illustrated in FIG. 1 and a raised position illustrated in FIG. 2. A lift/latch mechanism 34 (shown in FIG. 3) allows the operator to lift the upper platen 26.

Figure 2:
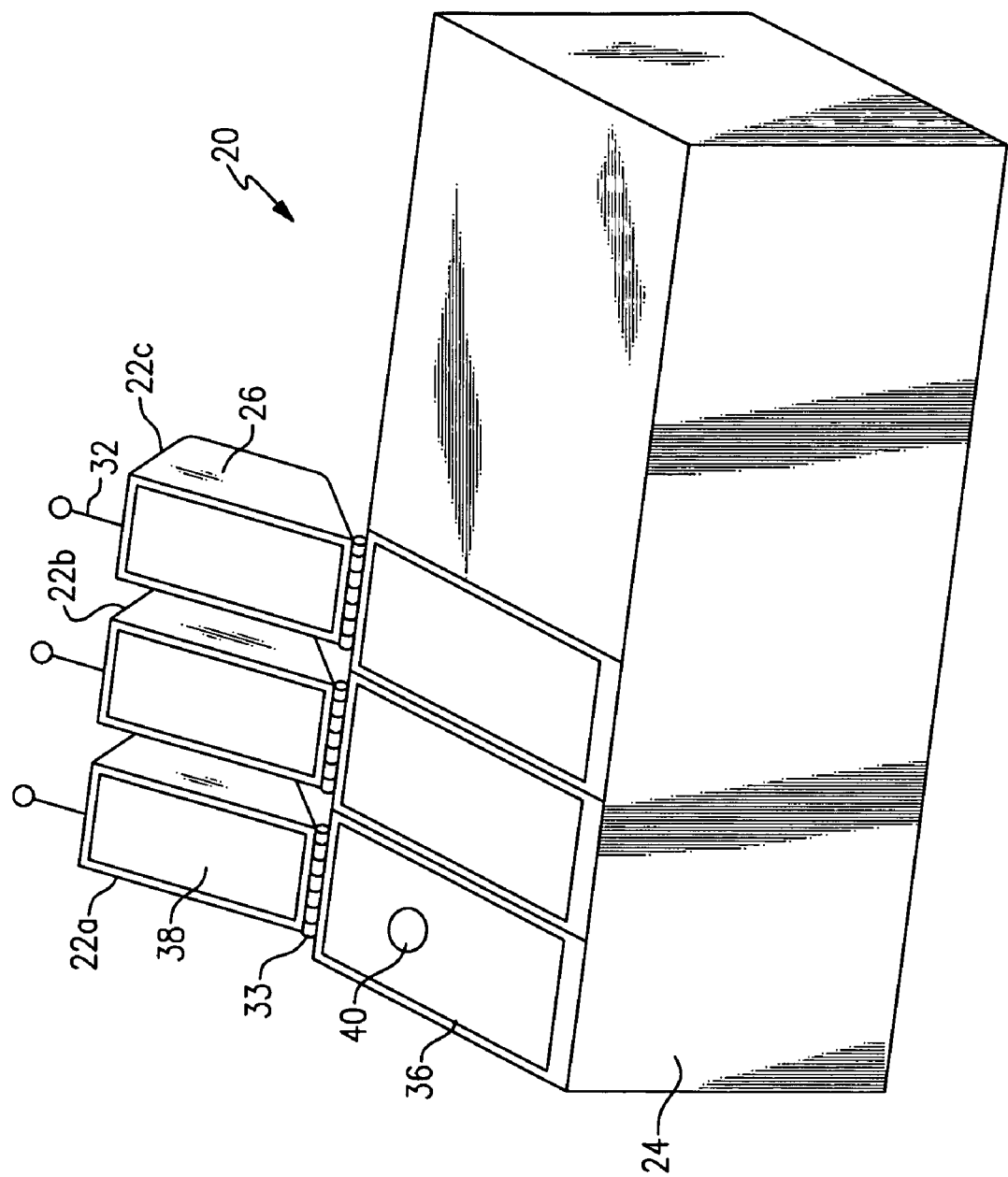
FIG. 2 illustrates a perspective view of the grill with the upper platens raised.

As shown in FIG. 2, the upper platen 26 is pivotally attached to the lower portion 24 by a hinge 33. The lower portion 24 and the upper platen 26 each include a respective grilling surface 36 and 38. When the upper platen 26 is lifted by an operator, the grilling surfaces 36 and 38 are exposed.

Food items 40 are placed on the lower grilling surface 36 by the operator for cooking. In one example, the food items 40 are hamburgers. The operator grabs the handle 32 and pivots the upper platen 26 downwardly to the position illustrated in FIG. 1, positioning the food item 40 in a gap 42 (shown in FIG. 4) between the lower grilling surface 36 and the upper grilling surface 38. The grilling surfaces 36 and 38 are heated by a respective heater (not shown) to cook the food items 40 in the gap 42.

Figure 3:
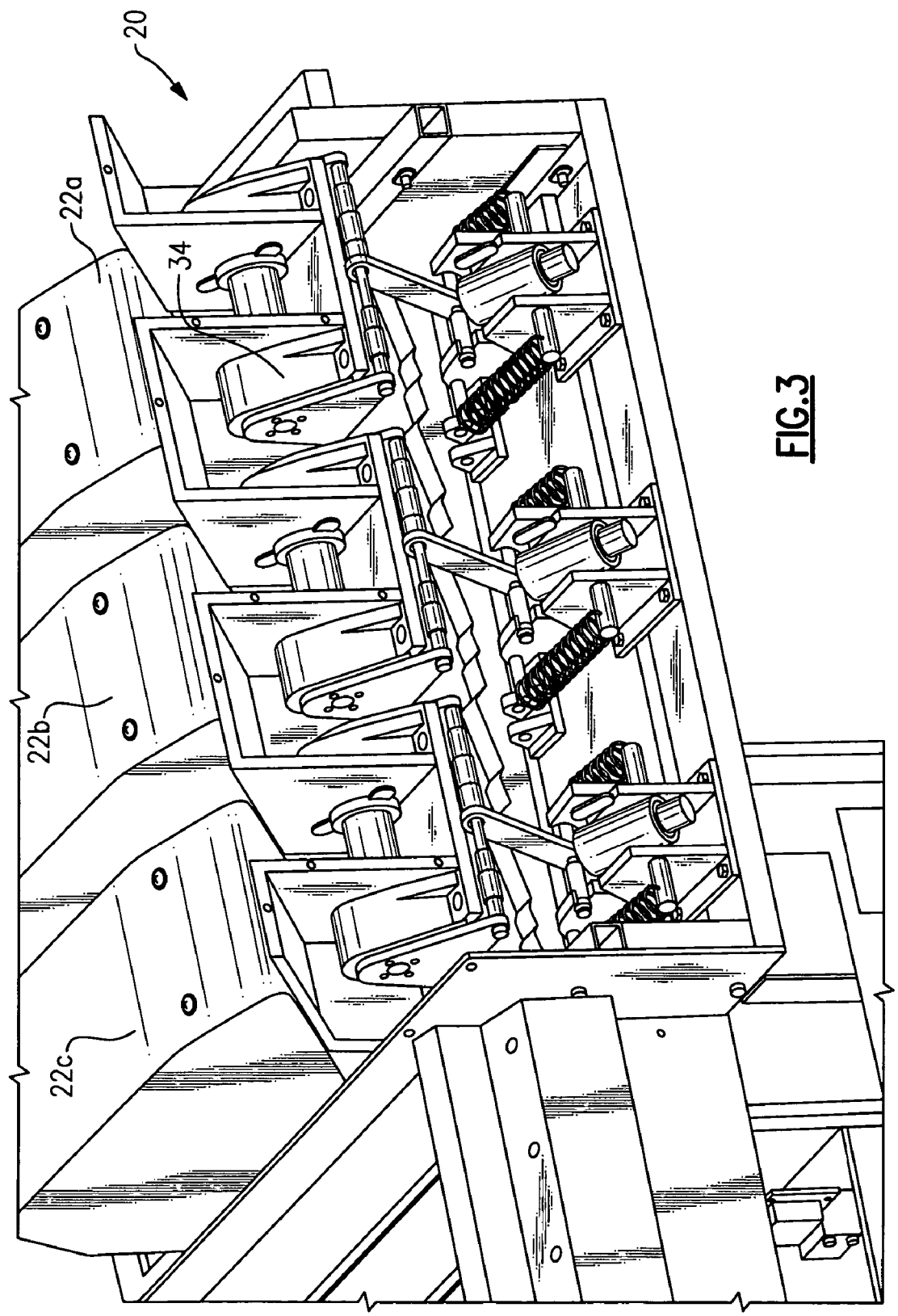
FIG. 3 illustrates a rear perspective view of a lift/latch mechanism.

FIG. 3 illustrates the lift/latch mechanism 34 that lifts the upper platen 26 relative to the lower portion 24 without the use of a motor. An operator can grab the handle 32 to lift the upper platen 26. Alternately, a button (not shown) can be pressed to actuate a solenoid 52 to lift the upper platen 26 without the use of a motor. A grill control operates the solenoid 52 automatically after the completion of a cook cycle.

Figure 4:
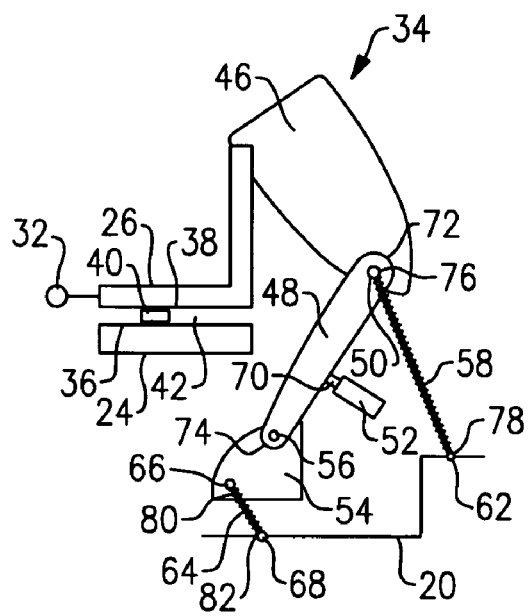
FIG. 4 illustrates a side view of the lift/latch mechanism in a lowered position.

FIG. 4 schematically illustrates the lift/latch mechanism 34 in a lowered position when the upper platen 26 is lowered relative to the lower portion 24, defining the gap 42 between the grilling surfaces 36 and 38. In the lowered position, the heated grilling surfaces 36 and 38 cook the food items 40 located in the gap 42.

The lift/latch mechanism 34 includes an upper pivotable portion 46 attached to a component of the upper platen 26 of the grill 20. A first end 72 of a turnbuckle 48 is pivotably attached to the upper pivotable portion 46 at an upper pivot 50. An opposing second end 74 of the turnbuckle 48 is attached to a lower pivotable portion 54 at a lower pivot 56.

The lift/latch mechanism 34 further includes a heavy resilient member 58 and a light resilient member 64. In one example, the heavy resilient member 58 and the light resilient member 64 are springs. A first end 76 of the heavy resilient member 58 is attached to the upper pivotable portion 46 at the location of the upper pivot 50, and an opposing second end 78 of the heavy resilient member 58 is attached to a stationary part of the grill 20 at a point 62. A first end 80 of the light resilient member 64 is attached to the lower pivotable portion 54 at a point 66, and an opposing second end 82 of the light resilient member 64 is attached to a stationary point of the grill 20 at a point 68. In one example, each grilling component 22a, 22b and 22c includes two light resilient members 64 and five heavy resilient members 58.

Figure 5:
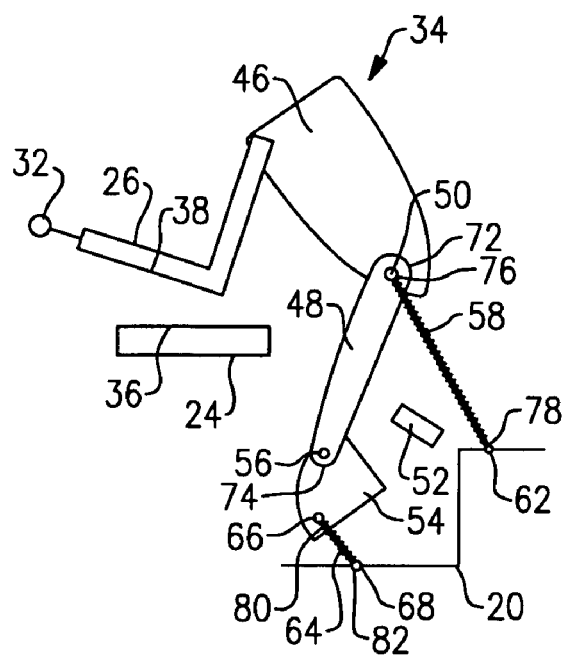
FIG. 5 illustrates a side view of the lift/latch mechanism in an almost lowered position.

As the upper platen 26 is lifted, the components of the lift/latch mechanism 34 move to the position shown in FIG. 5. When the operator grabs the handle 32 and lifts the upper platen 26, the upper pivotable portion 46 moves in a clockwise direction, pivoting the turnbuckle 48 about the upper point 50 and therefore pivoting the lower pivotable portion 54 counter-clockwise. In this position, the light resilient member 64 has not yet passed an over-center position. Therefore, if the upper platen 26 was released in this position, the light resilient member 64 would bias and return the upper platen 26 to the position shown in FIG. 4.

Figure 6:
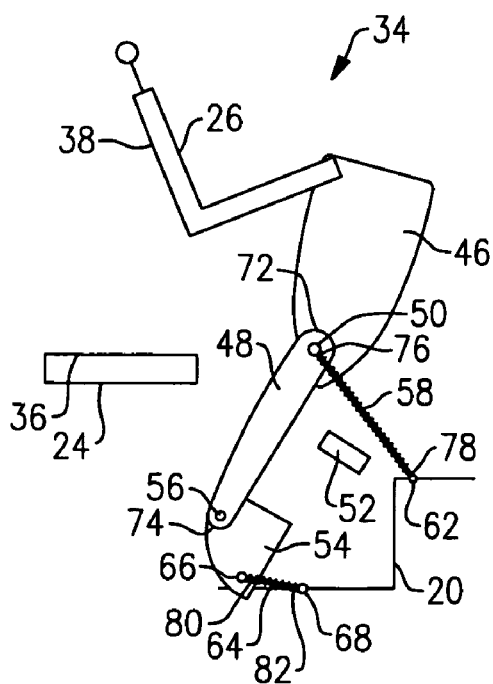
FIG. 6 illustrates a side view of the lift/latch mechanism in an almost raised position.
Figure 7:
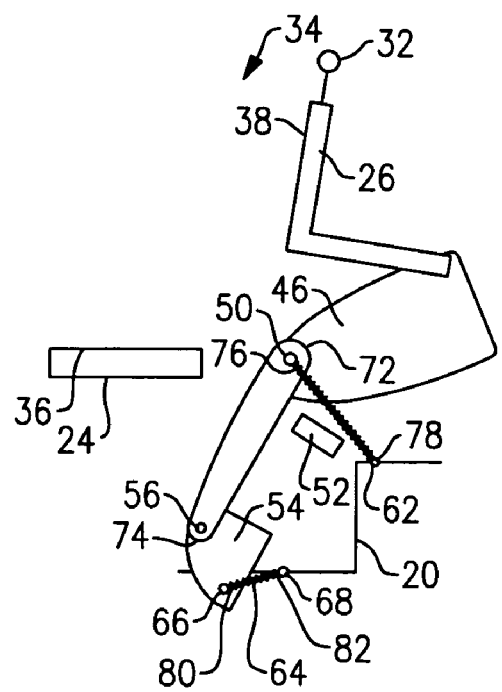
FIG. 7 illustrates a side view of the lift/latch mechanism in a raised position.

As the upper platen 26 continues to lift and reaches the position shown in FIG. 6, the light resilient member 64 has passed the over-center position. After the light resilient member 64 passes the over-center position, the heavy resilient member 58 overcomes the force provided by the light resilient member 64. If the upper platen 26 was released in the position, the heavy resilient member 58 would bias the upper platen 26 to the raised position of FIG. 7.

The upper platen 26 can be lowered by reversing this movement. The heavy resilient member 58 provides a force that biases the upper platen 26 into the raised position of FIG. 7. An operator actuates the handle 32 to lower the upper platen 26. After the light resilient member 64 passes through the over-center position, the light resilient member 64 overcomes the force provided by the heavy resilient member 58 to lower the upper platen 26 to the lowered position of FIG. 4.

The upper platen 26 is lowered by the operator when the food items 40 are added to the grill 20. However, the upper platen 26 may also need to be raised during an emergency, such as if an operator gets a hand or finger stuck between the grilling surfaces 36 and 38.

A solenoid 52 can be actuated to raise the upper platen 26. When an operator presses a button (not shown), a projection 70 from the solenoid 52 engages the turnbuckle 48. The projection 70 pushes the turnbuckle 48 to the left, as shown in FIGS. 4 and 5. The movement of the turnbuckle 48 pivots the upper pivotable portion 46 in a clockwise direction until the light resilient member 64 reaches and overcomes the over-center position. As explained above, the heavy resilient member 58 then provides a force that overcomes the force of the light resilient member 64 to lift the upper platen 26.

Alternately, the upper platen 26 can be manually raised by the operator in the event of an emergency, thus over-powering the latch.

The lift/latch mechanism 34 of the present invention operates without a motor. Therefore, the upper platen 26 can be raised without power.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A grill comprising:
   a first grilling surface moveable between a raised position and a lowered position, wherein the first grilling surface is part of an upper platen;
   a second grilling surface; and
   a mechanism to move the first grilling surface between the raised position and the lowered position, the mechanism including:
      a first resilient member that biases the first grilling surface to the raised position,
      a second resilient member that biases the first grilling surface to the lowered position,
      an upper pivotable portion attached to the upper platen,
      a lower pivotable portion, and
      an arm having a first end and an opposing second end, wherein the first end of the arm is pivotably attached to the upper pivotable portion at a first pivot, and the opposing second end of the arm is pivotably attached to the grill at a second pivot.

2. The grill as recited in claim 1 wherein the first resilient member includes a first end and an opposing second end, and the first end is attached to the first pivot and the opposing end is attached to a stationary location on the grill.

3. The grill as recited in claim 1 wherein the second resilient member includes a first end and an opposing second end, and the first end is attached to the lower pivotable portion and the opposing end is attached to a stationary location on the grill.

4. The grill as recited in claim 1 wherein the upper pivotable portion moves clockwise and the lower pivotable portion moves counter-clockwise when the upper grilling surface moves from the raised position to the lowered position, and the upper pivotable portion moves counter-clockwise and the lower pivotable portion moves clockwise when the upper grilling surface moves from the lowered position to the raised position.

5. The grill as recited in claim 1 wherein the second resilient member biases the first grilling surface to the lowered position and the first resilient member biases the first grilling surface to the raised position.

6. The grill as recited in claim 1 wherein the second resilient member has an over-center position, and the second resilient member is stretched when the first grilling surface is raised until the over-center position is reached, and then the first resilient member biases the first grilling surface to the raised position.

7. The grill as recited in claim 1 wherein the first resilient member has an over-center position, and the first resilient member is stretched when the first grilling surface is lowered until the over-center position is reached, and then the second resilient member biases the first grilling surface to the lowered position.

8. The grill as recited in claim 1 further including a solenoid, and actuation of the solenoid engages the arm to move the first grilling surface to the raised position.

9. A grill comprising:
   an upper grilling surface moveable between a raised position and a lowered position, and the upper grilling is part of an upper platen;
   a lower grilling surface;
   a mechanism to move the upper grilling surface between the raised position and the lowered position, the mechanism including:
      a first resilient member that biases the upper grilling surface to the raised position having a first end and an opposing second end,
      a second resilient member that biases the upper grilling surface to the lowered position having a first end and an opposing second end,
      an upper pivotable portion attached to the upper platen,
      a lower pivotable portion, and
      an arm having a first end and an opposing second end, and the first end of the arm is pivotably attached to the upper pivotable portion at a first pivot, and the opposing second end of the arm is pivotably attached to the grill at a second pivot,
   wherein the first end of the first resilient member is attached to the first pivot and the opposing second end of the first resilient member is attached to a first stationary location on the grill, and
   wherein the first end of the second resilient member is attached to the lower pivotable portion and the opposing second end of the second resilient member is attached to a second stationary location on the grill.

10. The grill as recited in claim 9 wherein the upper pivotable portion moves clockwise and the lower pivotable portion moves counter-clockwise when the upper grilling surface moves from the raised position to the lowered position, and the upper pivotable portion moves counter-clockwise and the lower pivotable portion moves clockwise when the upper grilling surface moves from the lowered position to the raised position.

11. The grill as recited in claim 9 wherein the second resilient member biases the upper grilling surface to the lowered position and the first resilient member biases the upper grilling surface to the raised position.

12. The grill as recited in claim 9 wherein the second resilient member has an over-center position, and the second resilient member is stretched when the upper grilling surface is raised until the over-center position is reached, and then the first resilient member biases the upper grilling surface to the raised position.

13. The grill as recited in claim 9 wherein the first resilient member has an over-center position, and the first resilient member is stretched when the upper grilling surface is lowered until the over-center position is reached, and then the second resilient member biases the upper grilling surface to the lowered position.

14. The grill as recited in claim 9 further including a solenoid, and actuation of the solenoid engages the arm to move the first grilling surface to the raised position.

* * * * *